US006953312B1

(12) United States Patent
Wheatley

(10) Patent No.: US 6,953,312 B1
(45) Date of Patent: Oct. 11, 2005

(54) PICK-UP TRUCK TIE-DOWN RAILS AND METHOD

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 10/716,676

(22) Filed: Nov. 20, 2003

(51) Int. Cl.$^7$ .............................................. B61D 45/00
(52) U.S. Cl. ..................................... 410/106; 410/110
(58) Field of Search .............................. 410/101, 102, 410/106, 108, 109, 110, 112, 113, 115, 116; 24/265 CD, 115 K; 248/499

(56) References Cited

U.S. PATENT DOCUMENTS

| 4,650,382 | A | * | 3/1987 | Johnson | 410/110 |
|---|---|---|---|---|---|
| 4,936,724 | A | * | 6/1990 | Dutton | 410/110 |
| 4,954,031 | A | * | 9/1990 | Geeck, III | 410/110 |
| 4,958,875 | A | * | 9/1990 | Zamzow | 296/32 |
| 5,476,349 | A | | 12/1995 | Okland | |
| 5,618,140 | A | * | 4/1997 | Okland | 410/106 |
| 5,827,024 | A | | 10/1998 | Davenport | |
| 5,904,458 | A | | 5/1999 | Bundy | |
| 5,967,719 | A | * | 10/1999 | Davenport | 410/106 |
| 5,997,227 | A | * | 12/1999 | Bundy | 410/106 |
| 6,146,069 | A | * | 11/2000 | Elwell et al. | 410/106 |
| 6,176,658 | B1 | | 1/2001 | Rowe | |
| 6,231,285 | B1 | * | 5/2001 | Elwell et al. | 410/107 |
| 2002/0012576 | A1 | * | 1/2002 | Anderson | 410/106 |

\* cited by examiner

Primary Examiner—H. Gutman
(74) Attorney, Agent, or Firm—Alex Rhodes

(57) ABSTRACT

A method and aluminum extruded, one-piece, easy to install tie-down rail for restraining a cargo in a pick-up truck is provided. The tie-down rail is comprised of an upper cylindrical thin wall section, an adjoining downward extending, substantially vertical wall portion and an adjoining inward extending lower flange portion for supporting the rail on a side panel of the pick-up truck. Rectangular apertures are provided in the vertical wall portion for receiving a tie-down rope, strap, or bungee cord and apertures are provided in the flange portion for attaching the rail to the pick-up truck. The method for making the rail comprises the steps of extruding an aluminum blank, cutting the blank to a specified length to form the rail, stamping the apertures in the vertical wall portion of the rail, drilling or stamping the apertures in the flange portion of the rail and applying a finish to the rail.

2 Claims, 2 Drawing Sheets

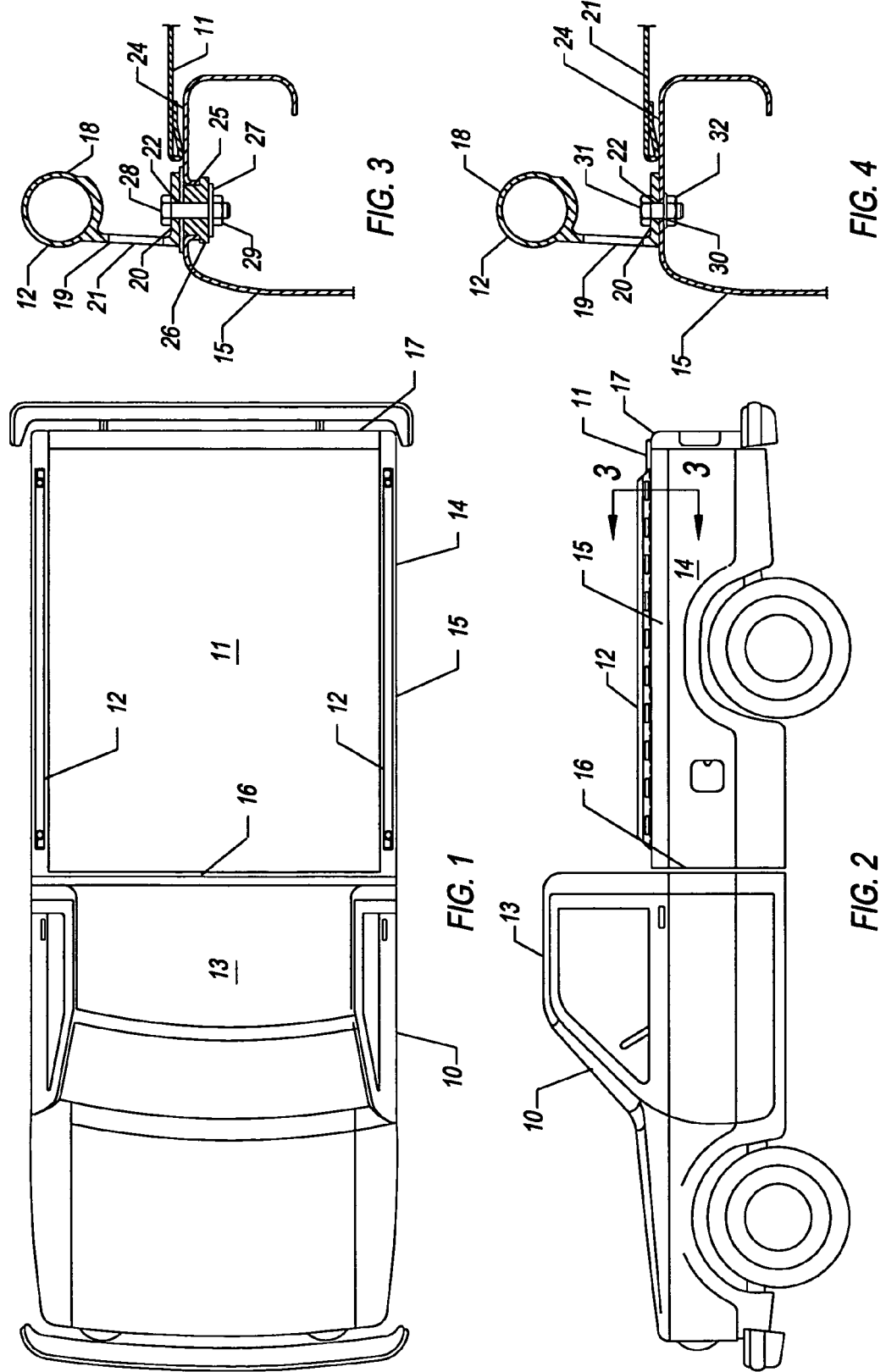

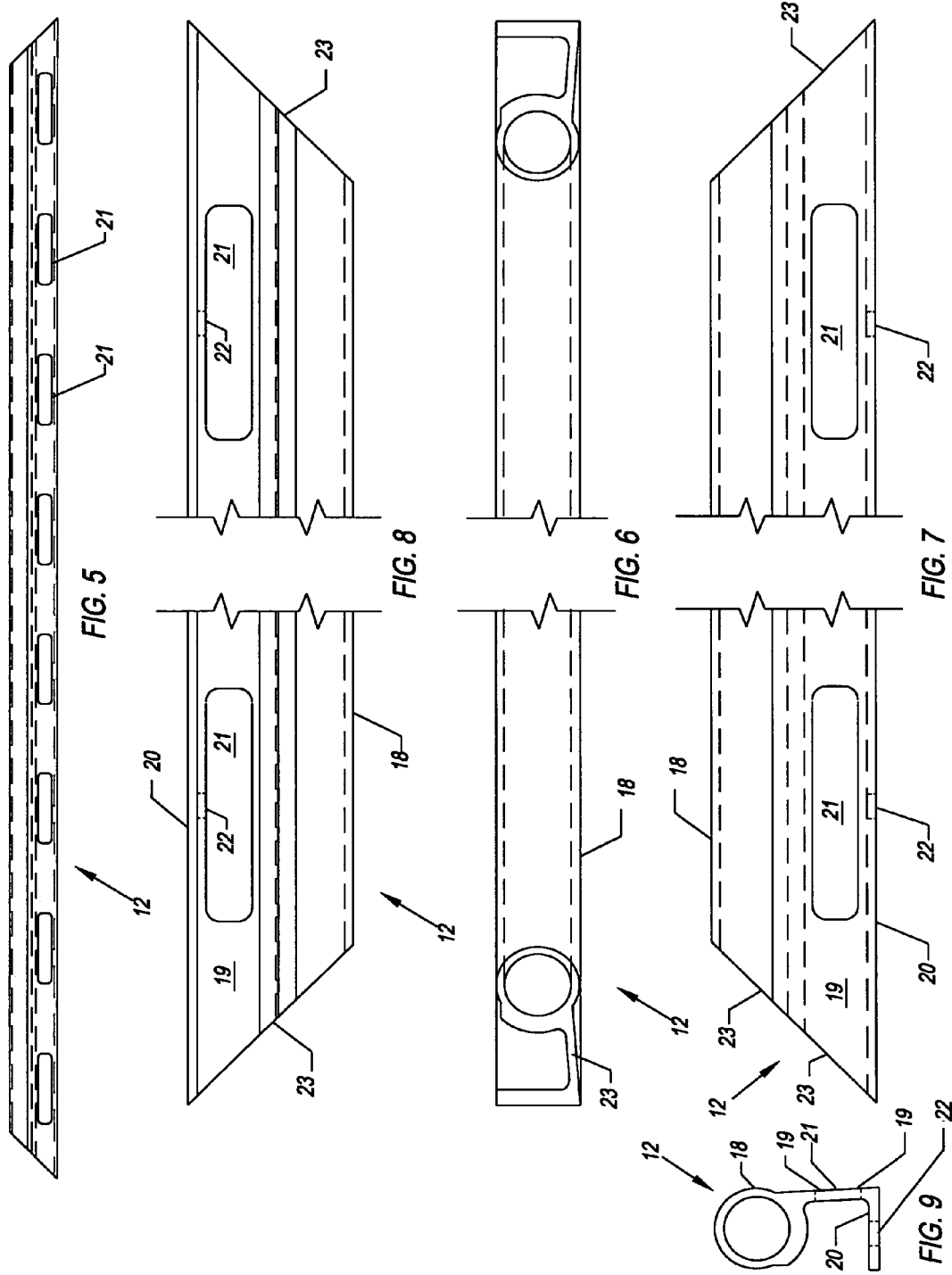

PICK-UP TRUCK TIE-DOWN RAILS AND METHOD

FIELD OF THE INVENTION

This invention relates to pick-up truck rails for securing cargo and more particularly to extruded, one-piece, easy to install, pick-up truck tie-down rails.

BACKGROUND OF THE INVENTION

Pick-up truck tie-down rails typically consist of tubes with bent ends or end brackets for attaching the rails to top ledges of cargo box side panels. They are usually mounted on cargo boxes by engaging stake or drilled holes. Tie-down rails known in the art suffer from a number of disadvantages such as, high tooling costs, excessive corrosion, lack of adaptability to alternate vehicles, inadequate structural stiffness, difficult-to-install procedures, misalignment and/or interference with cargo bed covers.

Many pick-up trucks have stake holes in tops of cargo boxes for attaching stakes and wooden rails. Although stakes and wooden rails are very seldom used, stake holes are convenient features for attaching tie-down rails. In many cases, drilled holes rather than stake holes are drilled to attach tie-down rails. In other cases, tie-down rails are welded to cargo boxes.

Drilled holes tend to weaken cargo boxes, induce corrosion and require special tools. Many tie-down rails are limited to one brand or model pick-up truck. This practice increases a manufacturer's tooling costs and inventory costs. Long spans between tie-down rail mountings of thin wall tubes result in excessive rail deflections and/or rail failures.

Okland U.S. Pat. No. 5,476,349; Davenport U.S. Pat. No. 5,827,024; Bundy U.S. Pat. No. 5,904,458 and Rowe U.S. Pat. No. 6,176,658 are exemplary of pick-up truck rails in the prior art. Okland 5,476,349 discloses a pair of fixed length tubular tie-down rails with separate die cast ends mounted in stake holes. The die cast ends require expensive molds. Moreover, the fixed length rails are specific to a single truck model.

Davenport 5,827,024 discloses a pair of fixed length one-piece tubular tie-down rails with bent ends. The rails are attached to a cargo box with bolts, drilled holes and brackets and are specific to a single truck model. Bundy 5,904,458 discloses a pair of pick-up truck rails mounted in drilled holes of a pick-up truck box. Rowe 6,176,658 discloses fixed length tie down rails bolted or welded to a pick-up truck box. None of the references are concerned with providing adequate clearances to cargo bed covers.

SUMMARY OF THE INVENTION

The present invention overcomes all of the above disadvantages. An extruded, one-piece tie-down rail provides numerous benefits over the prior art. One benefit is that it is easy to install. Another benefit is that it is moderate in cost. Another benefit is that it is adaptable to a range of vehicle brands and models. Another benefit is that it does not require an investment in expensive tooling. Another benefit is that it reduces inventory costs.

The present invention is comprised of a pair of identical one-piece extruded aluminum rails which mount on opposite outer ledges of a pick-up truck cargo box. Each tie-down rail is comprised of an upper tubular shaped portion, an adjoining intermediate downward extending planar portion and an adjoining lower inward extending planer flange portion. A series of apertures are provided in the downward extending intermediate planar portion for receiving tie-down ropes, straps or bungee cords. Apertures in the inward extending lower flange portion is used for attaching the rail to a pick-up truck. One feature of the invention is high torsional rigidity. This is due to the upper tubular portion.

In employing the teaching of the present invention, a plurality of alternate constructions can be adopted to achieve the desired objects and capabilities. In this disclosure, one preferred embodiment is described. However, the disclosed embodiment is intended as an example only and should not be considered as limiting the scope of the invention.

Further objects, features and benefits will be apparent by reference to the drawings and ensuing detailed description of a preferred embodiment which discloses the best mode contemplated in carrying out the invention. The exclusive rights which are claimed are set forth in the numbered claims following the detailed description of the preferred embodiment.

BRIEF DESCRIPTION OF THE DRAWINGS

The invention will be better understood and further objects, characterizing features, details and advantages thereof will appear more clearly with reference to the following diagrammatic drawings illustrating a preferred embodiment by way of non-limiting example only.

FIG. 1 is a plan view of a pick-up truck, a soft tonneau cover and a pair of tie-down rails according to the present invention.

FIG. 2 is a side view of the pick-up truck, tonneau cover and tie-down rails.

FIG. 3 is an enlarged cross-sectional view taken on the line 3—3 in FIG. 2.

FIG. 4 is an enlarged cross-sectional view of an alternate embodiment taken in the same manner as FIG. 3.

FIG. 5 is an enlarged outer side view of one of the tie-down rails.

FIG. 6 is an enlarged fragmentary plan view of the tie-down rail.

FIG. 7 is an enlarged fragmentary outer side view of the tie-down rail.

FIG. 8 is an enlarged fragmentary opposite side view of the rail.

FIG. 9 is an enlarged end view of the rail.

DETAILED DESCRIPTION OF A PREFERRED EMBODIMENT

Referring now to the drawings wherein like numerals designate like and corresponding parts throughout the several views, in FIGS. 1 and 2 a pick-up truck 10 is shown with a tonneau cover 11 and a pair of tie-down rails 12 mounted on a cargo box 14 according to the present invention. The pick-up truck 10 is conventional, consisting of a cab 13 and the cargo box 14 at the rear of the cab 13. The cargo box 14 has a pair of spaced apart side panels 15, a front panel 16 and a rear gate 17, mounted for rotation on the cargo box 14. The tonneau cover 11 is supported by the top of the cargo box 14. The tie-down rails 12 extend along the sides of the tonneau cover 11 and are attached to the side panels 15 of the cargo box 14. As shown in FIGS. 3 and 4, the tie-down rails 12 do not restrict the use of the tonneau cover 11.

One important feature of the invention is that the tie-down rails 12 are aluminum extrusions. Aluminum extrusions provide several important advantages over the prior art. One advantage is a substantial reduction in the investment in tools for manufacturing the rails 12 over the prior art. Another advantage is that rails 12 for long and short cargo boxes can be produced from a common extrusion. Another advantage is that extrusions have excellent surface finishes.

The tie down rails 12 are identical. With reference to FIG. 9, each of the tie-down rails 12 is comprised of an upper tubular type portion 18, an adjoining downward extending substantially vertical wall portion 19 and an adjoining inward extending horizontal planar flange portion 20. In the downward extending wall portion are a series of rectangular apertures 21 for receiving tie-down ropes, straps or bungee cords (not shown). Holes 22 are provided In the flange portion 20 for mounting the rail 12 on the cargo box 14. End portions 23 of the rails 12 incline downwardly.

Alternate methods for attaching the rails 12 to the cargo box side panels 15 are shown in FIGS. 3 and 4. In the first method, shown in FIG. 3, the lower flange portions 20 are attached to stake holes 25 in upper ledges 24 of the side panels 15 with rubber bushings 26, flat washers 27, bolts 28 and nuts 29. When the bolts 38 are tightened, the rubber bushings 26 expand diametrically to secure the bolts 38 to the side panels 15. In the second method, shown in FIG. 4, the lower flange portions 20 are secured to the side panels 15 with bolts 31 that extend through holes 30 and nuts 32.

The tie down rails 12 are produced by extruding an aluminum billet through a conventional die (not shown) to form a blank (not shown), laser cutting or sawing the blank to a proper length, stamping the rectangular openings 21 in a conventional stamping press, drilling or stamping the holes 22 in the lower flange portions 20 and applying a finish to the rails 12 by painting, plating, anodizing or another suitable process. A plurality of holes 22 can be provided in the lower flange portions 20 for alternate vehicle models and brands.

The invention being thus described, it will be obvious that the present invention provides important benefits over the prior art. The investment in tools for manufacturing the tie-down rails 12 has been substantially reduced. The cost of producing the rails 12 has also been substantially reduced. The inventory costs for storing parts in process have been substantially reduced. Still further, attractive rails with high rigidity have been provided.

It will be further obvious that although the invention may be varied in many ways, such variations are not to be regarded as a departure from the spirit and scope of the invention, and all such modifications as would be obvious to one skilled in the art are intended to be included in the scope of the following claims.

What is claimed is:

1. A tubular one-piece tie-down rail for securing a cargo in a pick-up truck, said tubular rail having a thin wall tubular shaped upper portion for effectively resisting torsional and bending stresses in said tubular rail, a short thin substantially vertical adjoining downward extending wall portion for attaching said upper tubular portion to a top surface of a side panel of a pick-up truck cargo box, said downward extending wall portion having a series of apertures for receiving a rope, strap or bungee cord, and an adjoining inward extending horizontal flange portion, said inward extending flange portion having a series of apertures for attaching said tie-down rail to said pick-up truck cargo box.

2. A pair of identical one-piece tubular tie-down rails for securing a cargo in a pick-up truck, each of said rails comprising a long slender upper tubular portion having a length for extending said rail along a substantial portion of a side panel of a pick-up truck cargo box for effectively resisting torsional and bending stresses in said rail, a short substantially vertical adjoining downward extending wall portion for attaching said tubular portion to a side panel of the pick-up truck cargo box, a means for receiving a rope, strap or bungee cord; and a means for attaching said tie-down rail to the side panel of said pick-up truck cargo box.

* * * * *